United States Patent
Jennings, III et al.

(10) Patent No.: US 8,260,773 B2
(45) Date of Patent: Sep. 4, 2012

(54) METHOD FOR EXTRACTING SIGNATURE FROM PROBLEM RECORDS THROUGH UNSTRUCTURED AND STRUCTURED TEXT MAPPING, CLASSIFICATION AND RANKING

(75) Inventors: Raymond B. Jennings, III, Ossining, NY (US); Hai Huang, White Plains, NY (US); Yaoping Ruan, White Plains, NY (US); Debanjan Saha, Mohegan Lake, NY (US); Ramendra K. Sahoo, Mohegan Lake, NY (US); Sambit Sahu, Hopewell Junction, NY (US); Anees A. Shaikh, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 12/236,938

(22) Filed: Sep. 24, 2008

(65) Prior Publication Data

US 2010/0082620 A1     Apr. 1, 2010

(51) Int. Cl.
*G06F 17/30* (2006.01)
(52) U.S. Cl. .................................. 707/723; 707/748
(58) Field of Classification Search .................. 707/723, 707/748
See application file for complete search history.

(56) References Cited

U.S. PATENT DOCUMENTS

| | | | | |
|---|---|---|---|---|
| 6,829,734 | B1 * | 12/2004 | Kreulen et al. | 714/46 |
| 7,155,668 | B2 * | 12/2006 | Holland et al. | 715/256 |
| 7,159,237 | B2 * | 1/2007 | Schneier et al. | 726/3 |
| 7,503,480 | B2 * | 3/2009 | Barnes et al. | 235/377 |
| 7,694,876 | B2 * | 4/2010 | Barnes et al. | 235/377 |
| 7,895,641 | B2 * | 2/2011 | Schneier et al. | 726/3 |
| 8,041,663 | B2 * | 10/2011 | Beaty et al. | 706/45 |
| 2002/0087882 | A1 * | 7/2002 | Schneier et al. | 713/201 |
| 2007/0162973 | A1 * | 7/2007 | Schneier et al. | 726/22 |
| 2009/0216697 | A1 * | 8/2009 | Beaty et al. | 706/45 |

* cited by examiner

*Primary Examiner* — Kim Nguyen
(74) *Attorney, Agent, or Firm* — Scully, Scott, Murphy & Presser, P.C.

(57) ABSTRACT

The structure attributes and unstructured attributes of a ticket are used to generate a problem signature. For structured attributes, correlation between field values is determined and fields with the highest weight are identified. For unstructured attributes, data mining techniques are applied to generate a plurality of keywords with a ranking for each ticket by identifying keywords, and commonly used acronyms and corpus variances. The set of structured attributes and the plurality of keywords from unstructured attributes form the signature of a given problem ticket.

25 Claims, 6 Drawing Sheets

PROBLEM ID: _____
PROBLEM HISTORY ID: _____
ENTRY TYPE: NEW / TRANSFER/ RESUMED
ENTRY DATE: _____
ENTRY TIME: _____
USER ID: _____
MODIFY DATE/ TIME: _____
PROBLEM CODE: _____

SEVERITY:
ORIGINAL SEVERITY: _____
DESCRIPTION:
PROBLEM ABSTRACT:
PROBLEM RESOLUTION: _____
OCCURRED DATE/ TIME: _____
OPENED DATE/ TIME: _____

CUSTOMER CODE

OPENED DATE/ TIME: _____
DURATION: _____
FIRST CALL ID: _____
FIRST CONTACT ID: _____
FIRST LOCATION ID: _____
LOCATION NAME: _____
GROUP ID: _____

METHOD FOR EXTRACTING SIGNATURE FROM PROBLEM RECORDS THROUGH UNSTRUCTURED AND STRUCTURED TEXT MAPPING, CLASSIFICATION AND RANKING

FIELD OF THE INVENTION

The present disclosure relates to problem and solution identification and management in information technology, and particularly to organizing and structuring problem and solution information records, and searching the same.

BACKGROUND OF THE INVENTION

Problem ticket generation usually is the first step in today's information technology (IT) process services management. In enterprise server management environment, support teams usually record problem resolution steps in problem records, also referred to as tickets, as part of their standard problem management process. The problem ticket generation step is responsible for describing problem symptoms reported by customers, and the problem ticket is the link between customer and services infrastructure. Once a problem ticket is generated, it will be queued in the ticketing system and routed to an appropriate center or person for problem determination. In the case when the ticket is opened either manually or automatically via monitoring systems, there are several fields to document information from the party reporting the problem.

Typically, these problem records or tickets are stored in relational databases with both structured (e.g. current status, problem type, support person/group handling the problem, type of system and component related to the problem) as well as unstructured (e.g. free-format text description of problem and solution as entered by the support personnel) attributes. The data also includes some form of quality assessment, time management, and business processing aspects.

The way problem records are entered into the ticketing system is also not standardized, and as a result, a number of overlapping, unstructured and even confusing attributes are present within the problem ticket records. For example, the problem records may contain a number of words, phrases, descriptions or even acronyms recorded or entered in an unstructured fashion. Such unstructured record tends to make searching on the records difficult. When it comes to problem resolution, system administrators often resort to ad-hoc keyword searches in problem record databases or even on Internet web sites manually.

FIG. 1 illustrates a known keyword methodology used in such ad-hoc keyword searches. All existing ticket information 101 is searched using one or more keywords shown at 102 to generate the result set shown at 103. These problem records are mostly used for tracking, auditing and reporting the problem at hand.

Known ticket classification methodologies do not combine the structure and unstructured attributes in a meaningful way. Furthermore, even when those methodologies use the structured attributes, they are put together with the unstructured attributes towards preparing bag of words without distinguishing of each of these structural attributes within any of the problem tickets. As a result any characteristics of any of the tickets represented by means of structural attributes get diffused within the context of unstructured field values.

BRIEF SUMMARY OF THE INVENTION

A method and system of extracting problem signature by combining structure attributes and unstructured attributes are provided. The method, in one aspect, may comprise analyzing structured ticket information of a problem ticket and extracting structured attributes from the problem ticket. The method may also comprise determining binding values for the structured attributes and ranking the structured attributes based on the binding values. The method may further comprise analyzing unstructured ticket information and generating a plurality of unstructured keywords that are related in context with one another and with respect to one or more of the structured attributes. The method may still comprise ranking said plurality of unstructured keywords and generating a signature for the problem ticket using said ranking of the structured attributes and said ranking of said plurality of unstructured keywords.

A system for extracting problem and solution signature from problem records through unstructured and structured text mapping, classification and ranking, in one aspect, may comprise module operable to analyze structured ticket information of a problem ticket and extract structured attributes from the problem ticket. The system may also comprise a module operable to determine binding values for the structured attributes and a module operable to rank the structured attributes based on the binding values. The system may further comprise a module operable to analyze unstructured ticket information and generate a plurality of unstructured keywords that are related in context with one another and with respect to one or more of the structured attributes. Still yet, the system may comprise a module operable to rank said plurality of unstructured keywords and a module operable to generate a signature for the problem ticket using said ranking of the structured attributes and said ranking of said plurality of unstructured keywords.

A system for extracting problem and solution signature from problem records through unstructured and structured text mapping, classification and ranking, in another aspect, may comprise a processor and means for analyzing structured ticket information of a problem ticket and extracting structured attributes from the problem ticket. The system may also comprise means for determining binding values for the structured attributes and means for ranking the structured attributes based on the binding values. The system may further comprise means for analyzing unstructured ticket information and generating a plurality of unstructured keywords that are related in context with one another and with respect to one or more of the structured attributes. The system may still comprise means for ranking said plurality of unstructured keywords and means for generating a signature for the problem ticket using said ranking of the structured attributes and said ranking of said plurality of unstructured keywords.

A program storage device readable by a machine, tangibly embodying a program of instructions executable by the machine to perform above-described methods may be provided.

Further features as well as the structure and operation of various embodiments are described in detail below with reference to the accompanying drawings. In the drawings, like reference numbers indicate identical or functionally similar elements.

DETAILED DESCRIPTION

A method and system are provided that represent problem records in a more structure manner, for instance, for ease of searching. The method and system in one embodiment also use the represented problem records as a source of reusable knowledge in solving related problems.

The attributes (also referred to herein as fields) within a problem ticket could be broadly categorized as structured or unstructured attributes. A structured attribute has well defined fields, which may be selected from a pull down menu, for example, on a user interface that allows users to enter problem information. The unstructured attributes are free form text and system and/or problem logs that could be either machine generated or individually entered into the system.

Figures 5, 6:
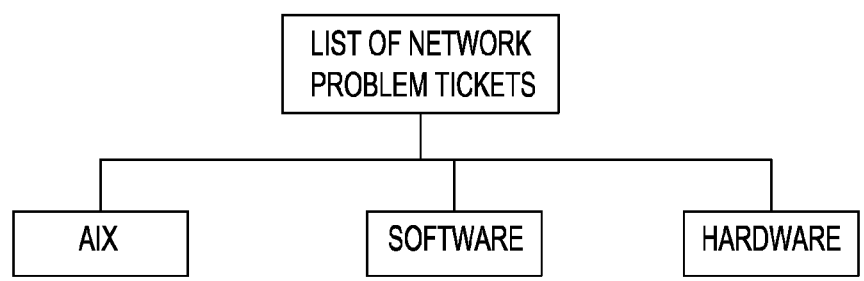
FIG. 5 shows an example of a ticket (or form), which can be used to enter or report problems, for example, occurring in IT infrastructure or application.
FIG. 6 illustrates a structural hierarchy of classification.

FIG. 5 shows an example of a ticket (or form), which can be used to enter or report problems, for example, occurring in IT infrastructure or application. Once a ticket is received, the ticket is characterized to isolate and identify the systems and services aspects both from components as well as functional point of view. Systems related characteristics are obtained from the structured components and also from unstructured attributes, for instance, by carrying out filtering and text analysis of the unstructured attributes.

A problem ticket may be categorized based on characterization of the structured information available within the problem ticket. Such structured information may include system characteristics at component level (e.g., operating system, etc.) and at function level (e.g., individual functions of an operating system, an application, etc.). Such structured information may also include provided services, solutions and process characteristics at component level and at function level. Examples of services may include transferring data, remote services, etc. A problem ticket may be also categorized based on extracting key service indicators (KSI) and information through unstructured information mining and text analytics. Unstructured information may be extracted to aid systems through problem isolation and solution identification. Unstructured information may be also extracted to optimize the problem ticket and solution matrix mapping including optimized problem routing and dynamical control of the target dates to meet the service level agreements (SLAs).

The system characteristics of problem tickets may provide classification, categorization and problem symptoms at a high level. The system characteristics may be determined from the types of structure attributes representing the system related events and problems, e.g., system related events such as open/close, hold for, resolved through etc.; cause code attributes such as network, hardware, software, storage, human error, etc.; components/items affected attribute such as install/setup, connect, client, outage, performance, service request, information request, etc. Similarly, service characteristics are typically represented by the ownership of the problems, problem open and close dates (as timing information) and resolution process related details. Services characteristics may be recorded as unstructured texts within the attributes as problem abstract, problem description, problem solution, etc.

Other attributes such as problem open/close data and time, owner of the problem group identification, etc., belong to the services characteristics represented as quantitative information within the problem tickets.

Figure 1:
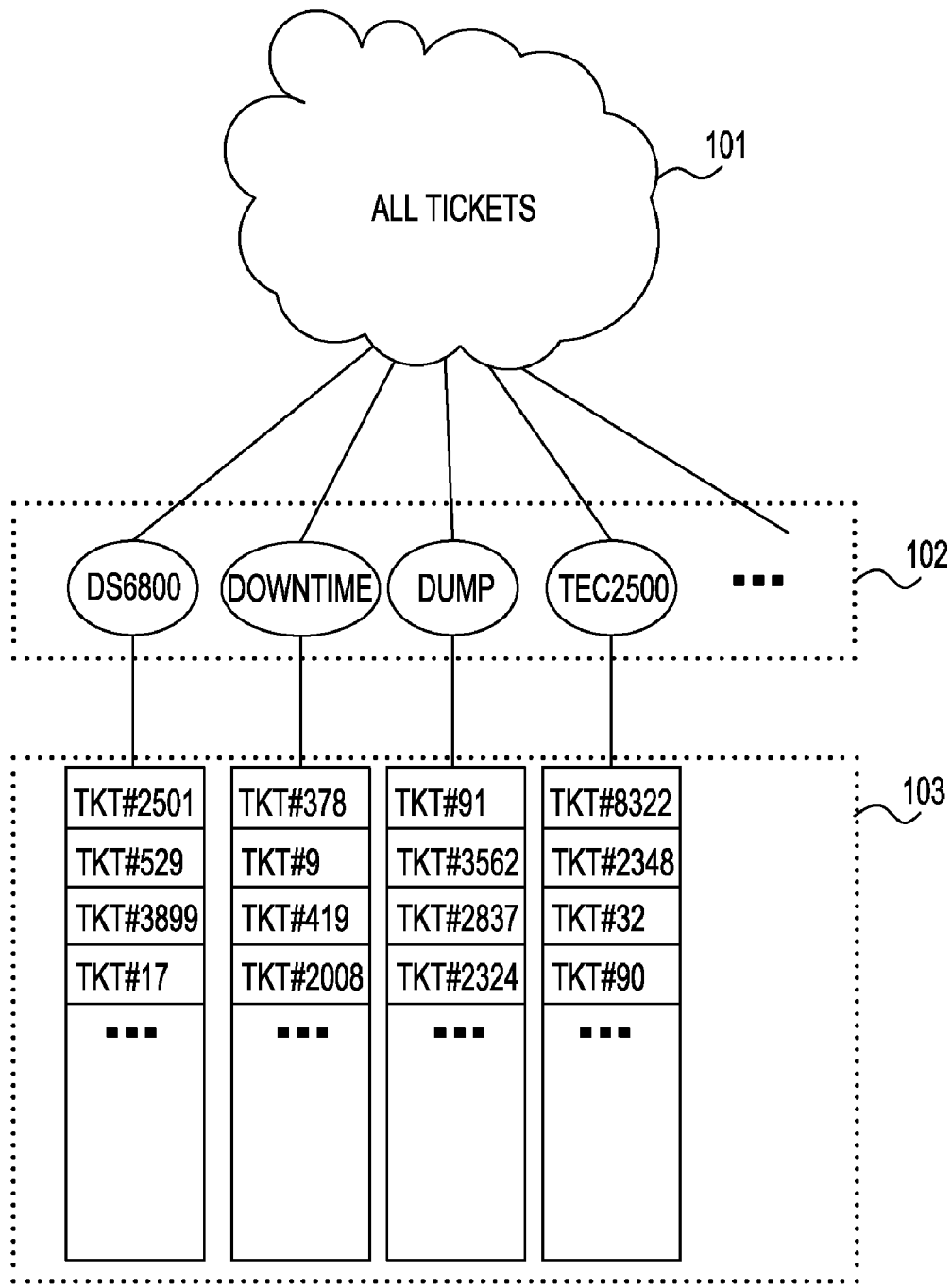
FIG. 1 shows a known keyword-based search.
Figure 2:
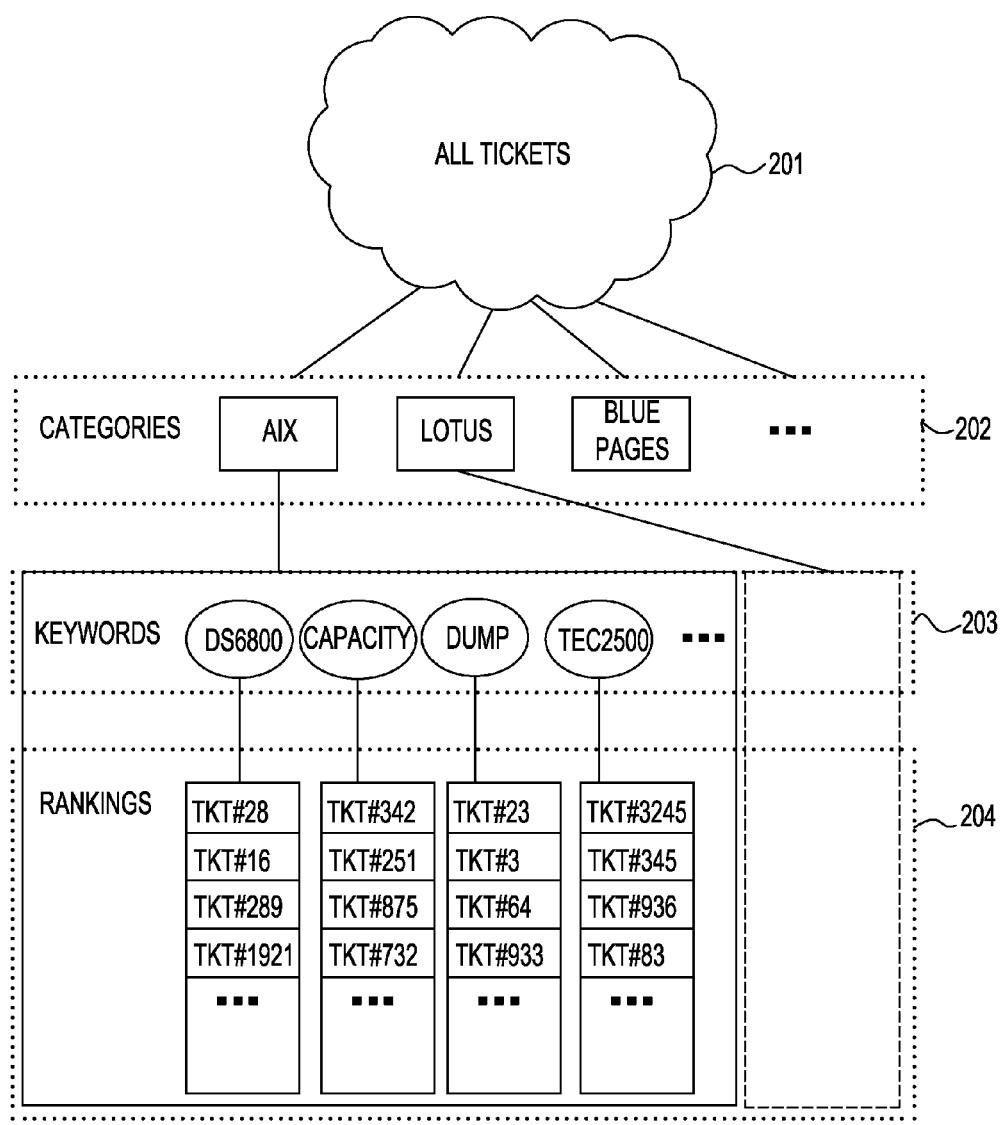
FIG. 2 is a diagram illustrating context-aware text analysis in one embodiment of the present disclosure.

FIG. 2 is a diagram illustrating context-aware text analysis in one embodiment of the present disclosure. In one embodiment of the present disclosure, the structure attributes and unstructured attributes of a ticket are combined and extracted as a problem signature. All tickets 201 received are categorized by structured attributes, for instance, those related to "AIX operating system", "Lotus", "Blue Pages", etc. as shown at 202. For structured attributes, correlation between field values is determined and fields with the highest weight are identified. The tickets categorized by structured attributes are further categorized using the unstructured attributes in the ticket. For example, data mining techniques are applied to venerate a bag of keywords. Examples of keywords may be "DS6800", "capacity", "dump", "TEC2500" as shown at 203. Keywords may also include commonly used acronyms and corpus variances. A bag of keywords preferably contain words that are closely related or words that together can signal or identify a problem. Each ticket is then ranked based on the bag of keywords as shown at 204. The set of structured attributes and the bag of keywords from unstructured attributes form the signature of a given problem ticket. This signature may be used to aid in new problem ticket generation and resolution by matching the maximum relevant information with a ticket signature bank. The signature generated may be used for future similar problem ticket entries and solutions, for instance, by saving those signatures in the ticket signature bank.

In one embodiment of the present disclosure, a signature may comprise a set of structured attributes and a bag of key words from unstructured attributes. For structured attributes, statistical correlation may be used to determine the binding of each field values, and to determine fields with ranks. In one embodiment, a binding for a field value is typically calculated through the probability of occurrence of the value with respect to the probability of occurrence of other field values. Similarly, ranks for a typical field value is based on the frequency of occurrence of it including the occurrence of other field values having same or similar meanings. An example of a binding of a field value may be: "Admin" problem type is associated with "Install" component. A binding may be a value such as a percentage value that indicates how much overlapping there are between tickets that have the similar fields. Ranks of a field may be determined based on the importance of that field. For example, a required field such as a "cause code" may have higher rank than an optional field.

For unstructured attributes, techniques such as data mining may be used to determine keywords, commonly used other acronyms and words (corpus variance), and provide a bag of word with ranking for each ticket. Bag of words refer to a group of words that are similar in context and in context with the problem ticket being analyzed. For each input problem record or problem ticket, the results are used to find out which tickets have maximum relevant information. That is, the structured attributes analyzed and the unstructured attributes analyzed are correlated.

In one embodiment of the present disclosure, dependency graphs may be utilized to represent the problem records. The dependency graphs, for instance, may be stored, and may be used to look for a problem signature (e.g., problems and the associated solution or solutions). Using the dependency graphs, the next set of relevant keywords may be provided, for example, interactively and dynamically, in a hierarchical manner. This helps the process of building a problem and solution signature as a "demand driven" activity, rather than framing the problem and solution management process into searching for rules or statically represented solution/problem rankings, or classifications or groups.

The following example illustrates a method of the present disclosure that ranks problem tickets according to structured and unstructured attributes in one embodiment. Consider following three problem tickets shown below.

Problem Ticket #1
Structured Attributes:
  Problem identifier: 28040911
  OPEN: 05-22-2006 17:57:31 CLOSE: 06-06-2006 21:58:35
  Operating system: AIX
Unstructured attributes (text in free form)
  Ticket was opened with a request to check 154 subnet for any checksum errors on tcp traffic and possible NFS problem.
  Found connection between two machines was slow.
  Found fragmentation in nfs traffic.
  Checked the SA switch connected to firewall.
  No CRC or other packet errors in the network interfaces.
  Ping status to the destination was fine.
  Gigabit ethernet interface to outside and line protocol were up.
  NFS code was upgraded to resolve the fragmentation problems.
  Problem was resolved.
Problem Ticket #2
Structured Attributes:
  Problem identifier: 2805321
  OPEN: 06-15-2004 7:32:21 CLOSE: 11-08-2004 11:18:45
  Operating system: AIX
  Problem Type Software
Unstructured attributes (text in free form):
  External Websites are down and they cannot telnet to it.
  Support has worked on the server to partial recovery.
  The customer does not think that the server is back up.
  Support will keep working towards 100% recovery.
  The severity was upgraded to severity1.
  Routing table displayed using command netstat-m;
  a static route added using route add command.
  A routing table flushed using "route flush" as a part of the solution.
Problem Ticket #3
Structured Attributes:
Problem identifier: 2907249
  OPEN: 01-18-2005 11:45:35 CLOSE: 11-22-2005 22:48:38
  Operating system: AIX
  Problem Type Hardware
Unstructured Attributes (problem description):
  With respect to a problem which we are facing on machine sharing the network adapter en3 on a06xgsasd1.ahe.uk.ibm.com lacks connectivity.
  The adapter appears fine from the AIX side, however, no traffic goes through.
  Checked the adapter again, there is no apparent problem from the systems side.
  Was asked to get the local network support to check the respective Ethernet switch port, and the connectivity from the adapter to the switch.
  Asked to nail down the failing component—as of now it could be anything from the switch over the cables/plugs/sockets to the adapter on the AIX box (although we are quite keen to say we would see errors in our error logs in the latter case but we don't).

An RCMS hardware ticket needs to be created in the UK in order to have the network parts checked.
This takes additional time first for the collection of all necessary data as well as second for the actual compilation and execution.
The communications problem on the 7028 P-Series server in the North Harbour campus has been investigated by the UK Network Front Office. It is established that there is: No problem with the server itself and that it has connectivity to the switch. The server connects to port 6/21 of the GBIBMGWA6509GIG2A switch and we suspect that there maybe one or two configuration issues within this device that will need to be resolved before the server will come on-line.
Unfortunately there is no access to a console session on the switch in question, so unable to investigate further in this direction. Traced out the port and it seems to be in vlan 209 port on green zone switch gig2a. It needs to be in vlan 208 to work.

As an example, the following bag of words from the above three tickets may be determined: Port (7), reconfigure (4), communication (13), switch (10), error log (8), connectivity (9), traffic (17), adapter (16), network (6), tcp (3), routing table (14), route (15), flush (12), telnet (11), server (2), gigabit ether net (5), CRC (19), packet errors (20), nfs (1), packet error (18). These words were determined as top 20 most frequently occurring words in the above three tickets. The numbers within the parenthesis represent the rankings for each of the words within the bag of words. Similarly, a binding of each of the words are prepared with the probability of occurrence of one word with respect to each of the other words within the bag of words. The joint probability has a value between 0 and 1.

Once the bag of words for all the tickets is prepared, for instance, as described above, each ticket may be represented through a comparison of binding and ranking of specific words within each ticket with respect to their occurrence and binding within a bag of words. The following signatures are determined for each ticket from the above bag of words and attribute ranking:

Ticket 1 Signature (from bag of words and rank): nfs (1), Gigabit Ethernet, tcp (3), traffic (17), CRC (19), packet error (20).

Ticket 2 Signature (from bag of words and rank): server (2), telnet (11), flush (12), routing table (14), route (15).

Ticket 3 Signature (from bag of words and rank): network (6), switch (10), communication (13), adapter (16).

As described above, based on extracting keywords and preparing a list of "bag of words" for these tickets a dictionary of words are prepared. A dictionary sometimes represents very context specific list of verbs and nouns specific to the area of texts need to be analyzed. By comparing the words present within each of the tickets a ranking of the words can be prepared for individual tickets through the use of text mining/data mining techniques available in literature. Similarly the ranking of the each of the tickets with respect to the bag of words can also be prepared by means of text mining and analysis.

A ticket signature represented by the bag of words and rankings of each word in the bag of words are used to compute the rank of a ticket in a pool of multiple tickets. Based on the ranking and binding value of each of the field values as part of the problem signatures, the three tickets #1, #2 and #3 in the above example are ranked as 1, 2 and 3 respectively. However, the above mode of ticket classification (based on existing methods in literature) does not provide any added value to a ticket beyond the value generated by means of the keywords extracted from the unstructured attributes.

The method and system of the present disclosure also use the structured attributes as a set of key field values to be treated as separate entities from the field values prepared by means of bag of word extraction techniques used for unstructured attributes. Further, any distinct structured attributes act as seeds to isolate and prepare hidden meanings of the problem signatures extracted from the unstructured texts. As a result, for example, each of the three tickets (ticket #1, #2 and #3) is distinctly differentiable as network, software and hardware problems encountered within systems having AIX as operating system. The signatures of the problem tickets 1, 2, and 3 above can be represented as below:

Ticket 1 Signature (from bag of words and rank): [network (structured attribute), AIX (structured attribute)] nfs (1), Gigabit Ethernet, tcp (3), traffic (17), CRC (19), packet error (20).

Ticket 2 Signature (from bag of words and rank): [network (structured attribute), AIX (structured attribute), software (structured attribute)]server (2), telnet (11), flush (12), routing table (14), route (15).

Ticket 3 Signature (from bag of words and rank): [network (structured attribute), AIX (structured attribute), hardware (structured attribute)]: network (6), switch (10), communication (13), adapter (16).

Figure 7:
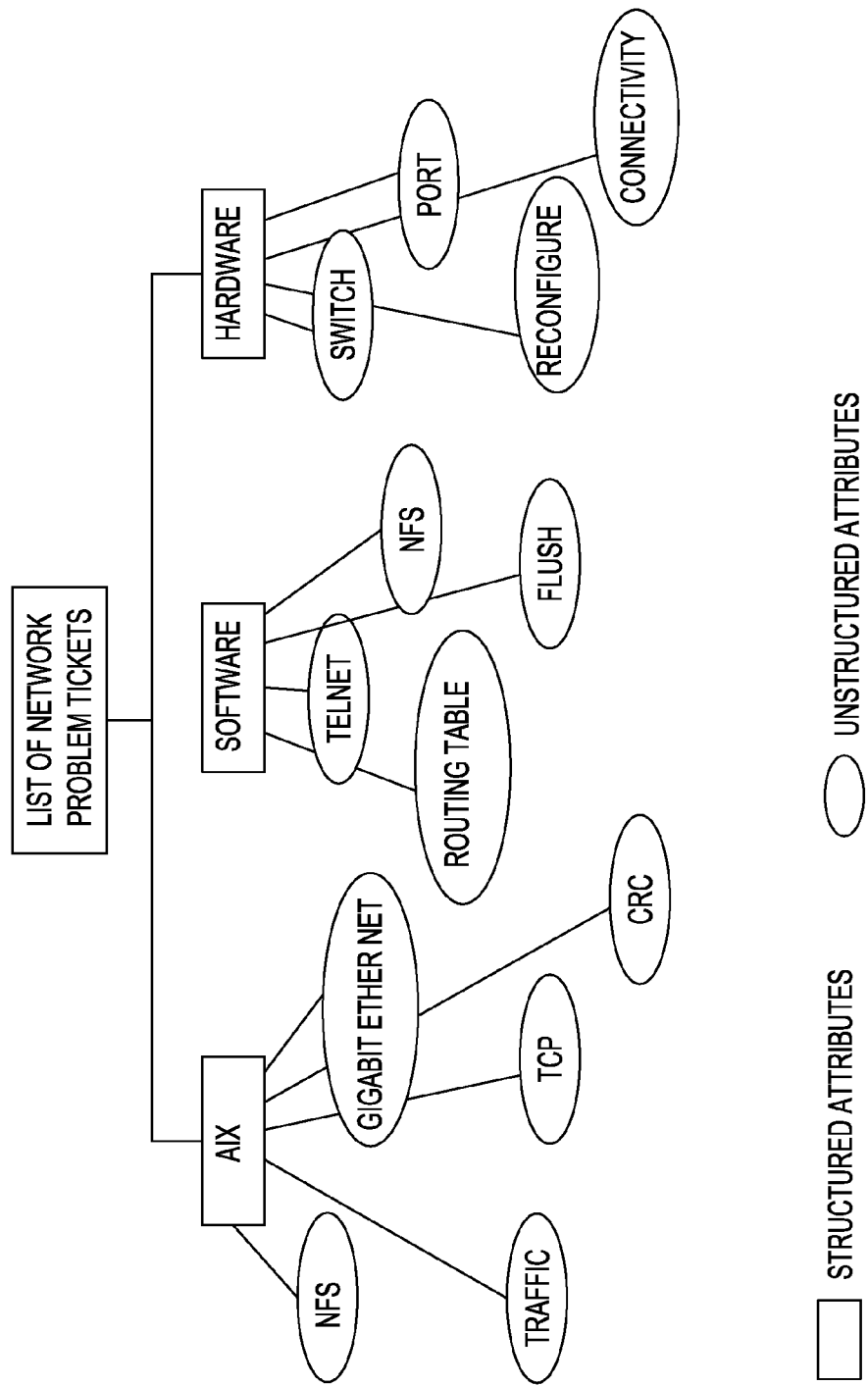
FIG. 7 illustrates a structural hierarchy of classification with related unstructured attributes.

As a result, further to the extraction of knowledge due to a distinct representation of the structured attributes (network, AIX, hardware, software) a hierarchy of the classification along with the representation of the unstructured attributes can be built added attributes. FIG. 6 illustrates an example of such a hierarchical representation corresponding to present embodiment. FIG. 7 illustrates a structural hierarchy of classification with related unstructured attributes can be stored within a database.

Figure 3:
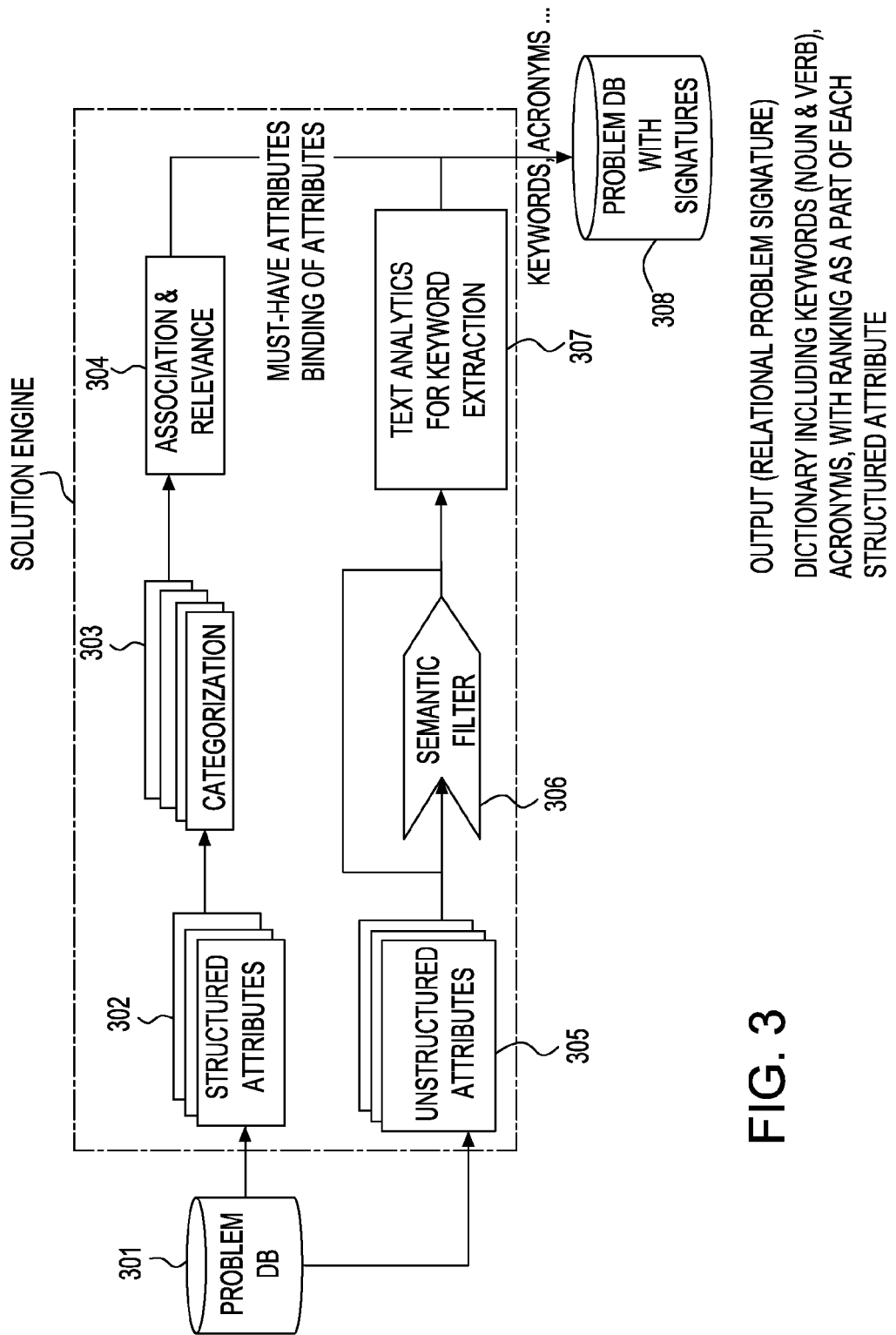
FIG. 3 shows system architecture in one embodiment of the present disclosure.

FIG. 3 shows system architecture in one embodiment of the present disclosure. A problem ticket is retrieved, for example, from a database or storage of tickets 301. At 302 structured attributes are retrieved from the tickets. At 303, the structured attributes are categorized. At 304, each attribute is bound. At 305, unstructured attributes are analyzed. At 306, a semantics filter module filters data. For instance, words not needed for unstructured attribute analysis are discarded. Examples of such words may be the articles, "the", "a", "an", etc. At 307, a bag of words are prepared from the filtered words. A bag of word is a collection of keywords filtered from each of the problem ticket, which may be used to prepare global ranking of the words. The extracted keywords and attributes having bindings are stored, for example, in a database, storage, or like at 308.

Figure 4:
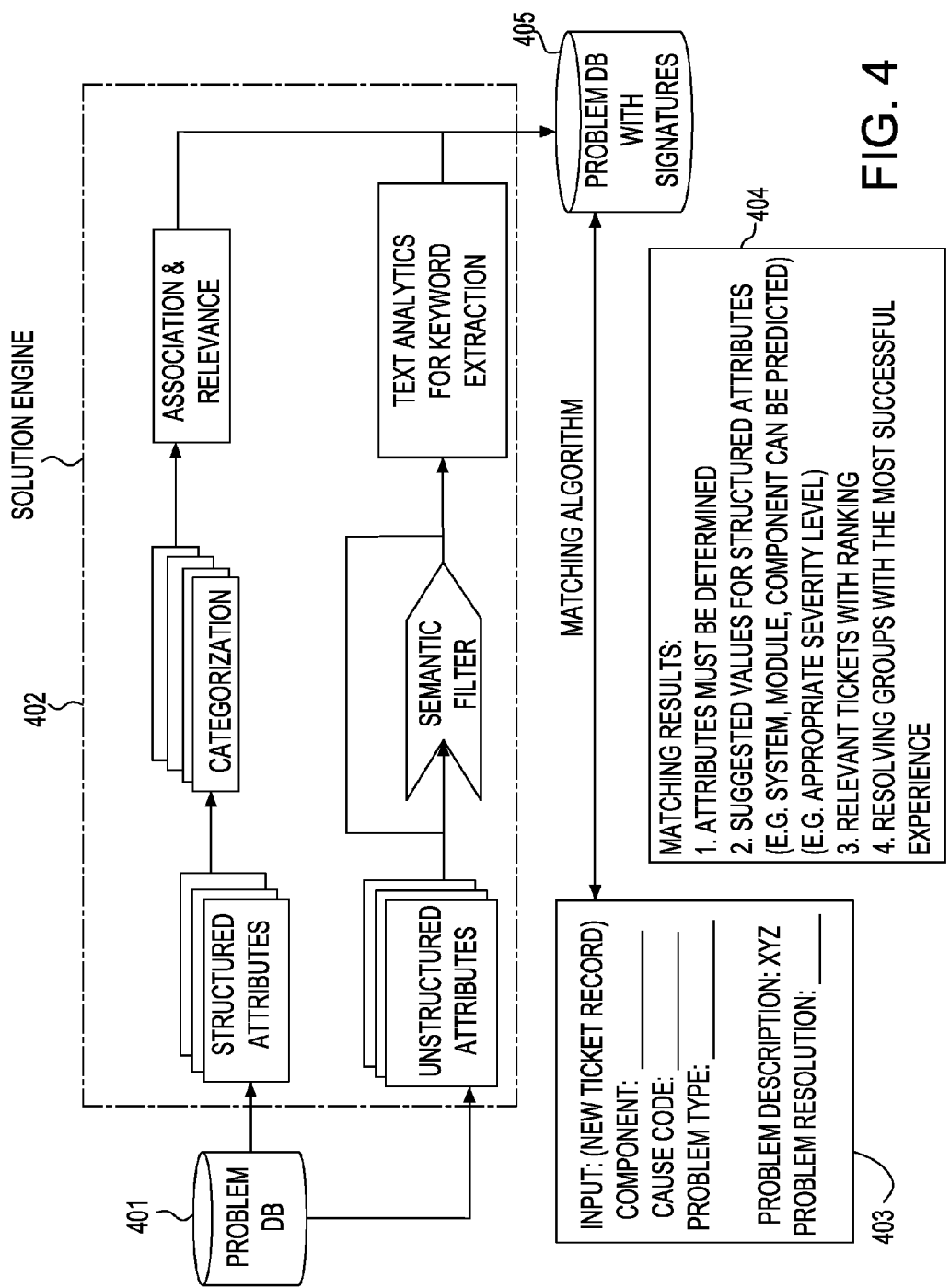
FIG. 4 shows a usage scenario in one embodiment of the present disclosure.

In another embodiment of the present method, the problem signatures extracted are stored in a database for future comparison and preparation of ranks of new incoming tickets with respect to old tickets already present within the ticket logs. FIG. 4 shows a usage scenario in one embodiment of the present disclosure. A new problem ticket at 403 may be analyzed to determine its structured attributes, a bag of words from its unstructured attributes. The analyzed structured and bag of words are compared with those in the database of problem ticket signatures 405. For instance, details of structured attributes and ticket signatures prepared for the new tickets may be compared with those present in the database.

FIG. 4 illustrates an arrival of new tickets, transformation of new tickets into a problem signature based on the incremental addition of field values into an already existing bag of words (e.g., if there are new keywords) and ranking the new ticket with respect to the updated bag of words. A problem ticket database 401 stores a plurality of tickets. A solution engine 402 may comprise an abstract representation of the components 302-307 shown in FIG. 3. As shown at 404, the created problem signatures are compared with the old signatures stored in database. The database is then updated to include the new problem signatures. Rankings of already existing tickets may be further updated due to introduction of a new ticket into the system. The database at 405 is updated with new signatures generated as a result of the new incoming tickets.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method for extracting problem and solution signature from problem records through unstructured and structured text mapping, classification and ranking, comprising:

analyzing structured ticket information of a problem ticket and extracting structured attributes from the problem ticket, the structured attributes comprising a system characteristic at a component level and at a functional level, a provided service at the component level, a provided service at the functional level, or combinations thereof;

determining binding values for the structured attributes, a binding value for a structured attribute computed as a probability of occurrence of the structured attribute with respect to a probability of occurrence of another structured attribute;

ranking the structured attributes based on the binding values;

analyzing unstructured ticket information and generating a plurality of unstructured keywords that are related in context with one another and with respect to one or more of the structured attributes;

ranking said plurality of unstructured keywords; and generating a signature for the problem ticket based on said ranking and binding values of the structured attributes and said ranking of said plurality of unstructured keywords, wherein the structured attributes include a plurality of data respectively associated with well defined fields of the problem ticket, the signature comprises a set of structured attributes and a bag of unstructured keywords, wherein the signature is formed for and associated with each given problem ticket.

2. The method of claim 1, wherein the binding values represent a probability of co-occurrence of a structured attribute with one or more of rest of the structured attributes from the problem ticket.

3. The method of claim 1, wherein the step of ranking said plurality of unstructured keywords includes binding said plurality of unstructured keywords based on a probability of co-occurrence of the plurality of unstructured keywords with one another, and ranking the plurality of unstructured keywords based on the binding.

4. The method of claim 1, further including generating signatures for a plurality of tickets respectively using said steps of claim 1.

5. The method of claim 4, further including generating a structured attribute bag of words based on a plurality of structured attributes extracted from the plurality of tickets.

6. The method of claim 5, further including generating an unstructured attribute bag of words based on a plurality of unstructured keywords associated with the plurality of tickets.

7. The method of claim 6, further including comparing the generated signatures of the plurality of tickets with the structured attribute bag of words and the unstructured attribute bag of words, and generating rankings of the plurality of tickets based on the comparing step.

8. The method of claim 7, wherein said structured attribute bag of words are generated using a data mining algorithm and said plurality of structured attributes associated with said plurality of tickets.

9. The method of claim 8, wherein said unstructured attribute bag of words are generated using a data mining algorithm and said plurality of unstructured keywords associated with said plurality of tickets.

10. The method of claim 9, wherein said structured attribute bag of words and said unstructured attribute bag of words are updated as one or more new tickets are analyzed.

11. The method of claim 10, further including storing said structured attribute bag of words and said unstructured attribute bag of words in a database of bag of words.

12. The method of claim 1, further including categorizing said problem ticket based on one or more of said structured attributes of said problem ticket into a category.

13. The method of claim 12, wherein the step of analyzing unstructured ticket information includes analyzing unstructured ticket information and generating a plurality of unstructured keywords that are related in context with one another and with respect to one or more of the structured attributes and with respect to said category.

14. A system for extracting problem and solution signature from problem records through unstructured and structured text mapping, classification and ranking, comprising:
a processor;
a computer-implemented module operable to analyze structured ticket information of a problem ticket and extract structured attributes from the problem ticket, the structured attributes comprising a system characteristic at a component level and at a functional level, a provided service at the component level, a provided service at the functional level, or combinations thereof;
a computer-implemented module operable to determine binding values for the structured attributes, a binding value for a structured attribute computed as a probability of occurrence of the structured attribute with respect to a probability of occurrence of another structured attribute;
a computer-implemented module operable to rank the structured attributes based on the binding values;
a computer-implemented module operable to analyze unstructured ticket information and generate a plurality of unstructured keywords that are related in context with one another and with respect to one or more of the structured attributes;
a computer-implemented module operable to rank said plurality of unstructured keywords; and
a computer-implemented module operable to generate a signature for the problem ticket based on said ranking of the structured attributes, the binding values, and said ranking of said plurality of unstructured keywords,
wherein the structured attributes include a plurality of data respectively associated with well defined fields of the problem ticket, the signature comprises a set of structured attributes and a bag of unstructured keywords, wherein the signature is formed for and associated with each given problem ticket.

15. The system of claim 14, further including a storage device for storing said signature.

16. The system of claim 14, wherein the binding values represent a probability of co-occurrence of a structured attribute with one or more of rest of the structured attributes from the problem ticket.

17. The system of claim 14, wherein the computer-implemented module operable to rank said plurality of unstructured keywords binds said plurality of unstructured keywords based on a probability of co-occurrence of the plurality of unstructured keywords with one another, and ranks the plurality of unstructured keywords based on the binding.

18. The system of claim 14, wherein the system generates a plurality of signatures corresponding to a plurality of tickets respectively.

19. The system of claim 18, wherein the system further generates a structured attribute bag of words based on a plurality of structured attributes extracted from the plurality of tickets.

20. The system of claim 19, wherein the system further generates an unstructured attribute bag of words based on a plurality of unstructured keywords associated with the plurality of tickets.

21. The system of claim 20, further including a computer-implemented module operable to compare the generated signatures of the plurality of tickets with the structured attribute bag of words and the unstructured attribute bag of words, and generating rankings of the plurality of tickets based on the comparing step.

22. The system of claim 21, wherein said structured attribute bag of words are generated using a data mining algorithm and said plurality of structured attributes associated with said plurality of tickets.

23. The system of claim 22, wherein said unstructured attribute bag of words are generated using a data mining algorithm and said plurality of unstructured keywords associated with said plurality of tickets.

24. The system of claim 23, wherein said structured attribute bag of words and said unstructured attribute bag of words are updated as one or more new tickets are analyzed.

25. A program storage device readable by a machine, tangibly embodying a program of instructions executable by the machine to perform a method of extracting problem and solution signature from problem records through unstructured and structured text mapping, classification and ranking, comprising:

analyzing structured ticket information of a problem ticket and extracting structured attributes from the problem ticket, the structured attributes comprising a system characteristic at a component level and at a functional level, a provided service at the component level, a provided service at the functional level, or combinations thereof;

determining binding values for the structured attributes, a binding value for a structured attribute computed as a probability of occurrence of the structured attribute with respect to a probability of occurrence of another structured attribute;

ranking the structured attributes based on the binding values;

analyzing unstructured ticket information and generating a plurality of unstructured keywords that are related in context with one another and with respect to one or more of the structured attributes;

ranking said plurality of unstructured keywords; and generating a signature for the problem ticket based on said ranking of the structured attributes, the binding values and said ranking of said plurality of unstructured keywords, wherein the structured attributes include a plurality of data respectively associated with well defined fields of the problem ticket, the signature comprises a set of structured attributes and a bag of unstructured keywords, and the binding values indicating probability of occurrence of a structured attribute value with respect to probability of occurrence of other structured attribute values, wherein the signature is formed for and associated with each given problem ticket.

* * * * *